Jan. 7, 1941.  A. M. MOORE  2,228,177
TAB MOUNTING FOR ALBUMS, ETC
Filed Nov. 21, 1939   2 Sheets-Sheet 1
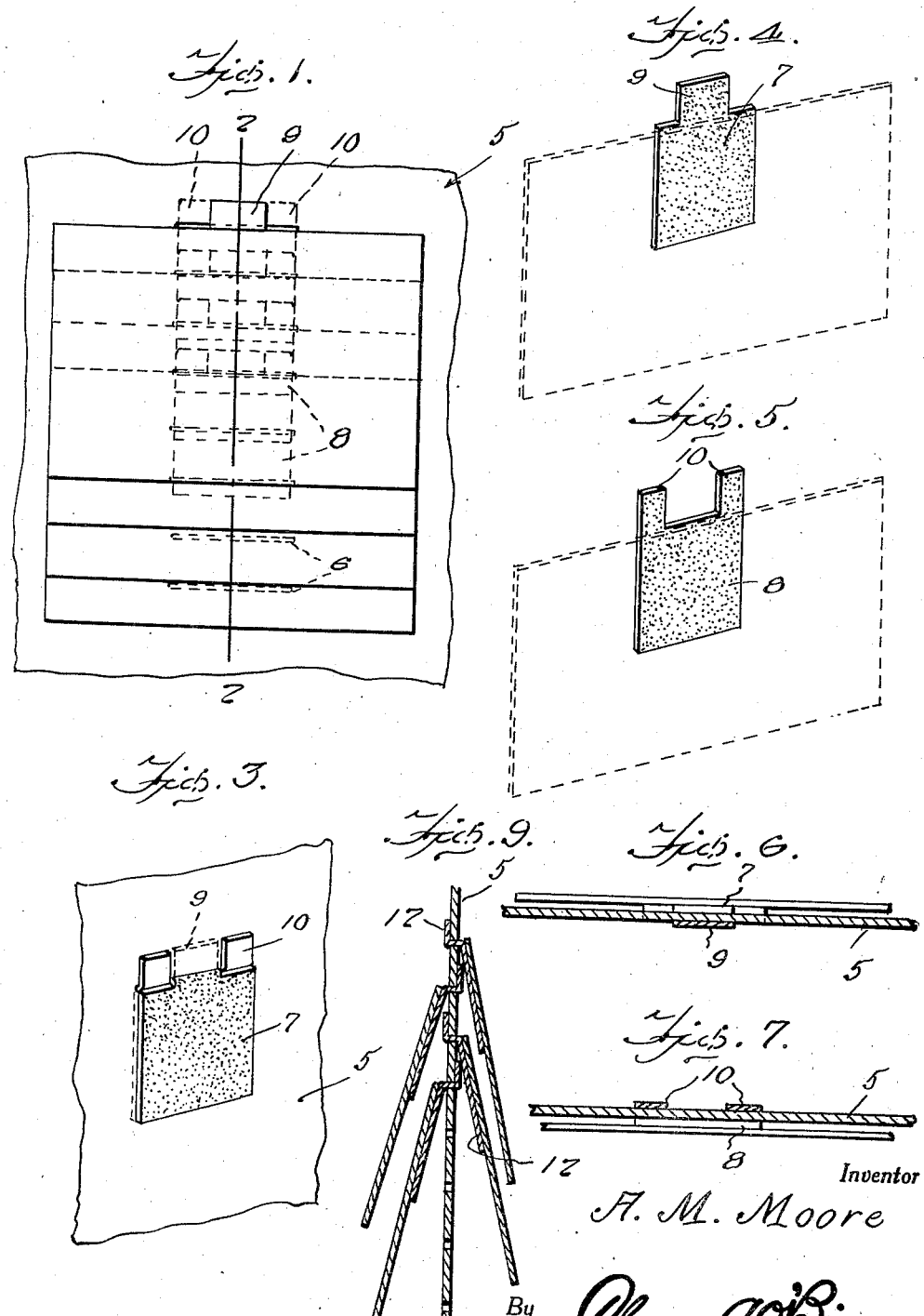
Inventor
A. M. Moore
By Clarence A. O'Brien
and Hyman Berman
Attorneys Jan. 7, 1941.  A. M. MOORE  2,228,177
TAB MOUNTING FOR ALBUMS, ETC
Filed Nov. 21, 1939   2 Sheets-Sheet 2
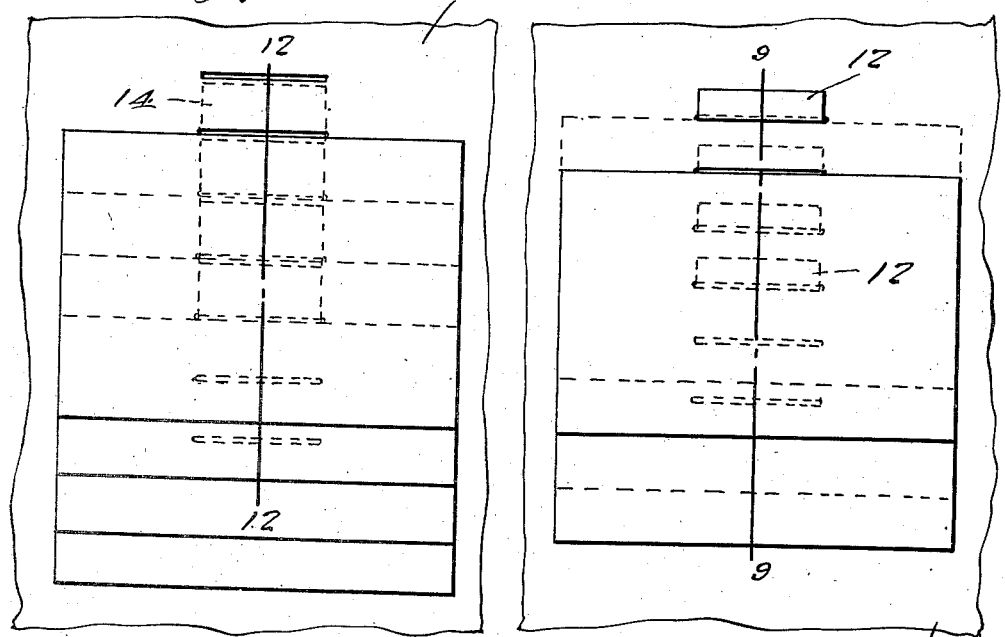
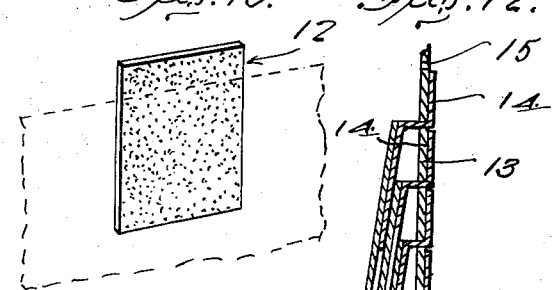
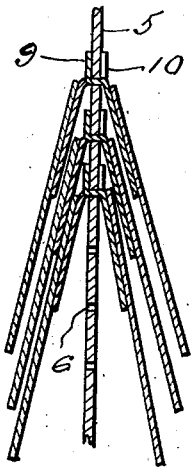
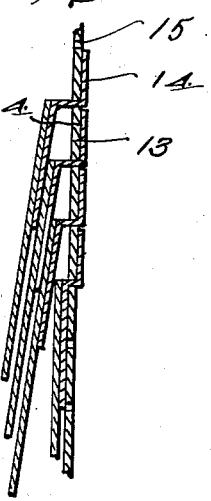
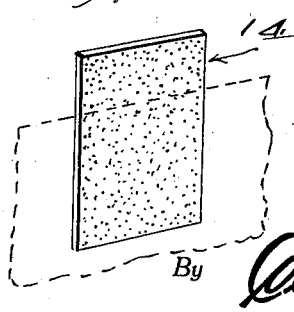
Inventor
A. M. Moore
By Clarence A. O'Brien
and Hyman Berman
Attorneys Patented Jan. 7, 1941

2,228,177

UNITED STATES PATENT OFFICE 2,228,177

TAB MOUNTING FOR ALBUMS, ETC.

Alonzo M. Moore, San Diego, Calif.

Application November 21, 1939, Serial No. 305,567

1 Claim. (Cl. 129—19)

This invention relates to tab mountings for albums, and the like, and has for the primary object the provision of a device of this character wherein each mounting sheet or page of an album or the like may have a large number of snap-shots, pictures, postal cards, etc., easily and quickly secured thereon whereby said pictures or the like may be swung relative to the mounting sheet so that each picture may be viewed as to its front and back and each mounting sheet turned as usual and also the present invention permits mounting of pictures, etc., on each face or side of the mounting sheet so that a maximum number of pictures, etc., may be safely kept in the album and easily viewed when desired.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 1 is a fragmentary plan view illustrating a portion of a mounting sheet with a series of pictures or the like secured thereon in accordance with my invention.

Figure 2 is a transverse sectional view taken on the line 2—2 of Figure 1.

Figure 3 is a fragmentary perspective view illustrating companion mounting tabs secured on the mounting sheet in accordance with this invention.

Figure 4 is a perspective view illustrating one of the tabs.

Figure 5 is a perspective view illustrating the other tab.

Figure 6 is a fragmentary longitudinal sectional view illustrating one of the tabs supporting a picture or the like on a mounting sheet.

Figure 7 is a view similar to Figure 6 illustrating the other or companion tab supporting a picture or the like on a mounting sheet.

Figure 8 is a fragmentary plan view illustrating a modification of the present invention.

Figure 9 is a sectional view taken on the line 9—9 of Figure 8.

Figure 10 is a perspective view illustrating a tab used in the mounting of pictures or the like as shown in Figure 8.

Figure 11 is a plan view illustrating another modification of the present invention.

Figure 12 is a sectional view taken on the line 12—12 of Figure 11.

Figure 13 is a perspective view illustrating the form of tab used in connection with the mounting of pictures as shown in Figure 11.

Referring in detail to the drawings, the numeral 5 indicates a fragmentary portion of a mounting sheet used in the construction of an album or the like. This sheet is provided with a plurality of relatively spaced slots 6 to permit mounting tabs 7 and 8 to be adapted thereto and in pairs, that is, the tabs 7 and 8 are constructed so as to be arranged on the mounting sheet in pairs with one tab overlying one face of the mounting sheet while the other tab overlies the other face of the mounting sheet.

The tabs 7 and 8 have gummed or adhesive faces and the tab 7 is cut-away to form an extension 9 while the tab 8 is cut-away to form spaced extensions 10. In adapting the tabs 7 and 8 to the mounting sheet the tabs are arranged in pairs with the extension 9 of the tab 7 fitting between the extensions 10 of the tab 8 when said extensions 9 and 10 are passed through a slot 6 of the mounting sheet. In adapting the mounting tabs 7 and 8 onto the mounting sheet they are so arranged that the gummed faces of the major portions of said tabs are disposed outwardly from the faces of the mounting sheet while the gummed faces of the extensions are disposed next to the face of the mounting sheet so that said extensions may be pressed against said face of the mounting sheet and become adhered thereto. Pictures, postal cards, etc. may be then secured one upon the other in stepped relation upon both faces of the mounting sheet by securing said pictures to said mounting sheet by the tabs or main portions thereof, it being understood that a pressure sensitive or permanently tacky adhesive is employed and the adhesive faces of the main portions of the tabs are pressed against said pictures so that they become hingedly connected to the mounting sheet and as before stated in overlapped stepped relation so that the pictures, postal cards or the like may be turned over or up for viewing the pictures or postal cards thereunder.

Thus it will be seen that a large number of pictures, postal cards, or the like may be grouped and secured on the mounting sheet upon both faces thereof and any one of the pictures or cards may be lifted upwardly for viewing the one directly thereunder.

Prior to applying the pictures, postal cards or the like to the tabs the major portions of said tabs may be swung upwardly and adhered one upon the other with the major portion of one tab of each group of tabs adhering to the face or faces of the mounting sheet so that as the tabs are needed in the mounting of a picture or postal card it may be loosened and swung downwardly to permit the placing of the picture or postal card adherently thereto. Or, the tabs may be provided on their major portions with a suitable removable covering to protect the adhesive prior to the application of a picture or postal card thereto.

Referring to my modified form of invention as shown in Figures 8 to 10, inclusive, the tab may be constructed of rectangular shape, as shown at 12, and passed through a slot of the mounting sheet 5 bringing one portion thereof in adhering relation to one face of the mounting sheet while leaving the other portion of the tab free for the application of a picture or postal card thereto. When adapting tabs as shown at 12 to the sheet as shown in Figure 9, these tabs are alternatingly arranged or passed alternatingly through the slots provided in the mounting sheet. This will permit the attaching of pictures or postal cards to either or both faces of the mounting sheet 5. However, this arrangement will not accommodate as many pictures or postal cards on the mounting sheet as the form of the invention shown in Figures 1 to 7, inclusive.

Referring to my modified form of invention as shown in Figures 11 to 13 tabs 14 are employed similarly shaped to the tabs 12 but are of a greater length. The tabs 14 as shown in Figure 12 are all inserted through their respective slots 15 of the mounting sheet 13 from one face of the latter so that pictures or postal cards will only be mounted for hinging movement upon one face of the mounting sheet 17. As will be seen in Figure 12 the folding of the tabs is varied to some extent, that is, the portions of the tabs which extend through the slots so that the lowermost picture or postal card will rest flatly upon the face of the mounting sheet while the other pictures or postal cards will rest flatly on each other in stepped relation and at a slight inclination to the lowermost picture or postal card which renders the assembling of the pictures or postal cards less bulky on the mounting sheet.

It is believed that the foregoing description when taken in connection with the drawings will fully set forth the construction and advantages of this invention to those skilled in the art to which such a device relates so that further detailed description will not be required.

Having thus described my invention, what I claim is:

In a device of the character described, a mounting sheet having spaced slots, pairs of tabs having adhesive thereon, one tab of each pair having an extension and the other tab of each pair of tabs having spaced extensions, said extensions of the corresponding pairs of tabs interfitting and extending through the same slots with the extensions adhered to the faces of the mounting sheet with the remaining portions of the tabs free to permit articles to be adhered thereto.

ALONZO M. MOORE.